United States Patent [19]

Melcher et al.

[11] Patent Number: 4,911,947
[45] Date of Patent: Mar. 27, 1990

[54] METHOD FOR INDUCING COLOR SHIFT IN METALLIC PAINTS

[75] Inventors: James R. Melcher, Lexington; Stuart Inkpen, Arlington, both of Mass.

[73] Assignee: Massachusetts Institute of Technology, Cambridge, Mass.

[21] Appl. No.: 896,489

[22] Filed: Oct. 3, 1986

Related U.S. Application Data

[62] Division of Ser. No. 824,918, Feb. 3, 1986, Pat. No. 4,818,627.

[51] Int. Cl.⁴ .......................... B05D 1/04; B05D 3/06
[52] U.S. Cl. ......................................... 427/26; 427/39; 427/58
[58] Field of Search .................... 427/39, 26, 47, 58

[56] References Cited

U.S. PATENT DOCUMENTS 2,418,479 4/1947 Pratt et al. .......................... 117/64

FOREIGN PATENT DOCUMENTS 707543 4/1965 Canada .................................. 427/39

Primary Examiner—Bernard Pianalto
Attorney, Agent, or Firm—Paul J. Cook

[57] ABSTRACT

Multicolored tone paint compositions containing flat metallic particles are produced by subjecting an electrically conductive substrate coated with the paint composition, while wet, to ion current. The field caused by the corona current vertically orients the metallic particles in that portion of the paint subjected to the current while the metallic particles in the unexposed paint remain in horizontal orientation.

5 Claims, 1 Drawing Sheet

METHOD FOR INDUCING COLOR SHIFT IN METALLIC PAINTS

This is a divisional of co-pending application Ser. No. 824,918 filed Feb. 3, 1986, now U.S. Pat. No. 4,818,627.

BACKGROUND OF THE INVENTION

This invention relates to a method for modifying metallic paint coated on a surface by inducing a color shift in the paint in a desired area and to the product so-produced.

At the present time, metallic paints are used extensively, particularly in the automotive industry, to produce a dress coat because they exhibit a shininess and color flop when viewed at different angles. These characteristics of metallic paint give the final paint finish a dimensional or contoured appearance. It is common practice, particularly in the automotive industry, to create a two tone effect or form trim stripes which are painted separately on the surface utilizing a masking technique. These processes are labor extensive and require considerable skill to insure obtaining the same finish as the dress coat when the different colored paint is applied.

It would be highly desirable to provide a means for producing a two tone or trim effect on a surface painted with metallic paint without the need for applying separate paint coats to the surface. Furthermore, it would be desirable to provide such a means which permits modifying the metallic paint precisely in a desired design to produce a two tone effect.

In accordance with this invention, a method is provided for subjecting an electrically conductive substrate coated with a metallic paint to a small corona current in order to orient the metallic particles in the paint in the direction of the corona current. By orienting the flat metallic particles in the paint in the same direction, a color contrast to the originally applied paint is produced in the treated portion of the paint. The metallic paint is subjected to the corona current while the paint is still wet and therefore while the metallic particles in the paint are still mobile under the influence of the electrical field caused by the corona current. The present invention also provides the product produced by the process of this invention comprising the electrically conductive substrate coated with a metallic paint wherein at least a portion of the coated metallic paint includes an area wherein the metallic particles are oriented in essentially the direction vertical to the substrate surface.

DECSRIPTION OF SPECIFIC EMBODIMENTS

Figure 1:
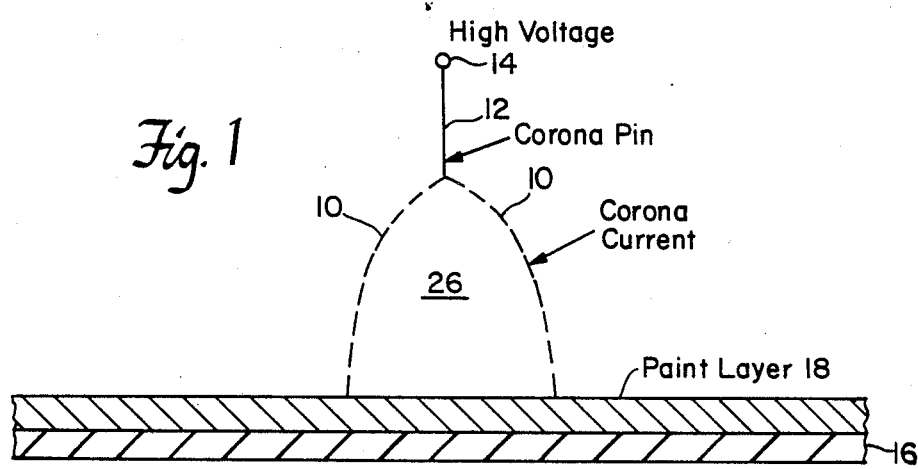
FIG. 1 is a schematic view representing the process of this invention utilizing a single source of corona current.

In accordance with this invention, an electrically conductive substrate is coated with a metallic paint composition containing flat metallic particles capable of being oriented in an electric field. Any conventional metallic paint composition can be utilized in the process of this invention. Typically, the paint composition comprises a polymeric resin dispersed in a solvent which includes pigments and the metallic particles. Typical polymeric resins include ethylenically unsaturated polymers such as acrylates, acrylics, urethane acrylates and acrylated polyesters. Typical metal particles utilized in paints include aluminum, silver, copper and ferrous metal compositions such as steel particles or the like. In any event, the metallic particles must be capable of being oriented under the influence of an electric field when the paint is still wet so that the particles are able to be oriented within the paint composition. When the particles are oriented so that they are positioned substantially vertically with respect to the substrate surface, reflection of the light from the paint particles is reduced so that the overall color appears darker as compared to the untreated paint wherein the metallic particles are horizontally positioned and thus reflect more incident light than the oriented particles.

The size of the paint area to be treated in accordance with this invention depends on a variety of parameters. The corona current is produced by supplying electrical imaging to a pin electrode wherein the electrically conductive substrate coated with the wet paint comprises the ground electrode. The area of the corona current interacting with the wet paint coating can be increased by increasing the size of the pin electrode, increasing the distance between the pin electrode and the painted surface, increasing the current to the pin electrode or by utilizing a focusing electrode interposed between the pin electrode and the electrically conductive substrate. Generally, the current supplied to the pin depends upon the geometry and the properties of the paint. There is also trade-off between the current and the exposure time. These quantities are approximated by considering the electroviscous time, $$T_{ev} = \eta/\epsilon E^2$$

which can be related to the corona current using, $$E = I/A\sigma$$

such that, $$T_{ev} = \frac{\eta A^2 \sigma^2}{\epsilon I^2}$$

where
$\eta$—viscosity of sprayed paint layer
$\sigma$—conductivity of sprayed paint layer
$\epsilon$—permittivity of sprayed paint layer
A—area of paint layer effected
I—total corona current.

Times on the order of 10 $T_{ev}$ should be used to obtained distinctive color variation without degrading the surface of the paint which occurs at high (<30) electroviscous times. These times are also sensitive to the ratio of the paint layer thickness, d, to the larger flake diameters, w, industrially often approximately 1→3. A single pin electrode or a plurality of pin electrodes arranged in an array corresponding to the area desired to be treated on the painted surface can be utilized. Furthermore, the pin electrode and painted surface can be moved relative to each other, either by moving the pin electrode or the painted surface, thereby to form the desired design on the painted surface. It is also within the scope of this invention to treat the entire painted surface when it is desired to change the color of the entire surface. After the painted particles have been oriented in the desired area of the wet paint surface, the paint is dried or cured, thereby permanently setting the orientation of the metal paricles.

The present invention also comprises a new article of manufacture wherein at least a portion of an electrically conductive substrate coated with a paint composition containing metallic particles have the metallic particles oriented in substantially the same direction as the corona current to which they are subjected. As noted above, the article of manufacture can have all or only a portion of its painted surface treated in accordance with this invention to orient the metallic particles in the paint.

Referring to FIG. 1, the corona current positioned within envelope 10 is formed from a pin electrode 12 connected to a source of high voltage 14 and the conductive substrate 16 which functions as an electrode in forming the field due to the corona current. The wet paint composition containing metallic particles 18 is coated on electrically conductive substrate 16.

Figure 2:
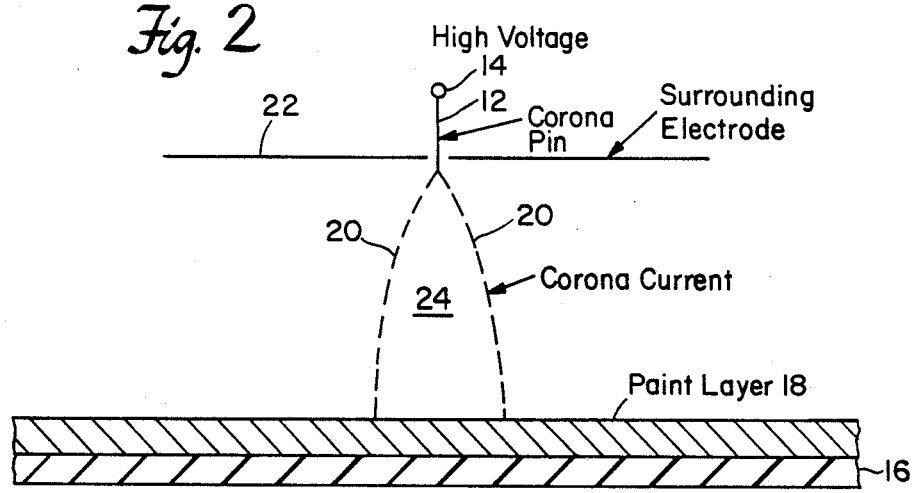
FIG. 2 is a schematic view representing the process of this invention including a focusing means.

In FIG. 2, the same elements as in FIG. 1 are designated by the same numerical designations. With the apparatus of FIG. 2, a surrounding electrode 22 is provided which surrounds rounds the pin electrode 12. The surrounding electrode 22 functions to focus the corona current 20 to form a narrower envelope 24 as compared to the corona current 26 of FIG. 1.

Figure 3:
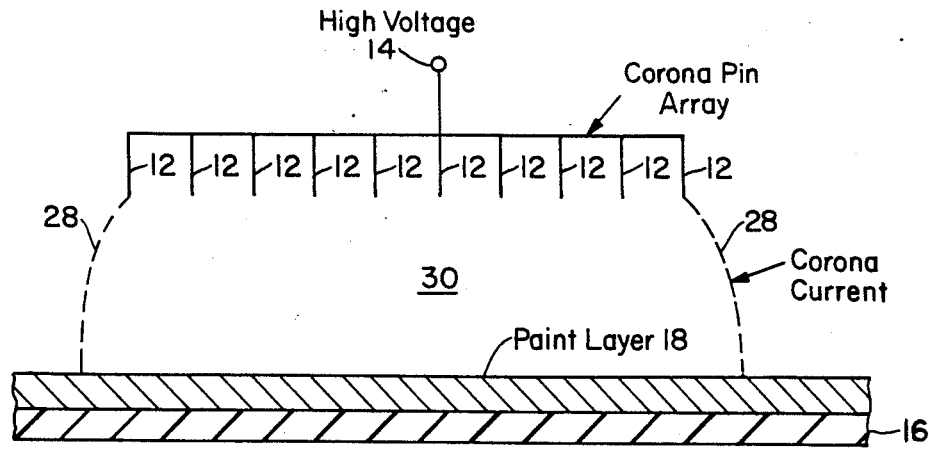
FIG. 3 is a schematic view representing the process of this invention utilizing a plurality of sources of corona current.

As shown in FIG. 3, the high voltage source 14 is connected to a plurality of pin electrodes 12 which are aligned to form a corona current 30 defined by envelope 28 of a particular size and shape as desired.

The following example illustrates the present invention and is not intended to limit the same.

EXAMPLE I

A test sample was made using a standard straight pin as the high voltage corona source. A plate approximately size inches square was sprayed using a Binks Model 80 mechanical paint sprayer and a non-aqueous automotive enamel paint from Dupont, number K-383Y-BR055. This paint is a light blue metallic paint containing aluminum flakes with an average diameter of 9.7 $\mu$m yet a significant number were approximately 25 $\mu$m diameter or greater. The paint layer was sprayed to 75 $\mu$m thickness and then exposed to the corona source. The corona current was maintained at 3 $\mu$amps for approximately 5 secs by bringing the pin to $-3.6$ kV relative to the grounded plate. The spacing between the pin and the plate was 7 mm resulting in an affected area of 2 cm in diameter.

The properties of the sprayed paint were measured to $$\epsilon = 5.9\epsilon_o \text{ where } \epsilon_o = 8.854 \times 10^{-12} \frac{\text{farads}}{m}$$

$$\sigma = 6.1 \times 10^{-8} \frac{\text{mhos}}{m}$$

$$\eta = 0.24 \frac{kg - m}{\text{sec}}$$

This results in an electroviscous time $\tau_{ev}$ of 0.19 secs. Therefore, the exposure time is 27 $\tau_{ev}$. The color of the affected area was measured using a Minolta Chroma Meter II. The change in color $\Delta E$ between the unaffected area and the area exposed to the corona current was 7.8 where a $\Delta E$ of 0.9 is barely detectable with the eye. No distortion of the surface quality was detected.

We claim:

1. The process for modifying the color of a paint composition containing flat metallic particles with comprises applying said paint composition in the liquid state to an electrically conductive substrate, exposing at least a portion of said applied paint in the liquid state to a corona current, thereby to orient said metallic particles substantially in the same direction as the direction of said field and drying or curing said paint composition.

2. The process of claim 1 wherein said metallic particles are ferrous particles.

3. The process of claim 1 wherein said metallic particles are silver particles.

4. The process of claim 1 wherein said metallic particles are copper particles.

5. The process of claim 1 wherein said metallic particles are aluminum particles.

* * * * *